United States Patent
Terai et al.

(10) Patent No.: US 11,648,815 B2
(45) Date of Patent: May 16, 2023

(54) VEHICLE AIR CONDITIONER

(71) Applicant: TOYODA GOSEI CO., LTD., Kiyosu (JP)

(72) Inventors: Nobuhiro Terai, Kiyosu (JP); Chiharu Totani, Kiyosu (JP); Yasuhiro Maruta, Kiyosu (JP); Hisashi Takaya, Kiyosu (JP); Takashi Ishikawa, Kiyosu (JP)

(73) Assignee: TOYODA GOSEI CO., LTD., Aichi-pref. (JP)

( * ) Notice: Subject to any disclaimer, the term of this patent is extended or adjusted under 35 U.S.C. 154(b) by 805 days.

(21) Appl. No.: 16/541,803

(22) Filed: Aug. 15, 2019

(65) Prior Publication Data
US 2020/0101812 A1 Apr. 2, 2020

(30) Foreign Application Priority Data
Sep. 28, 2018 (JP) .............................. JP2018-183248

(51) Int. Cl.
*B60H 1/00* (2006.01)
(52) U.S. Cl.
CPC ..... *B60H 1/00035* (2013.01); *B60H 1/00028* (2013.01); *B60H 2001/00192* (2013.01)
(58) Field of Classification Search
CPC ............ B60H 1/00028; B60H 1/00035; B60H 1/00192
USPC ......................................................... 454/69
See application file for complete search history.

(56) References Cited

U.S. PATENT DOCUMENTS

| 4,022,599 | A | * | 5/1977 | Wilson | ............... | B60H 1/00042 165/41 |
| 5,816,064 | A | * | 10/1998 | Moore | ............... | B60H 1/00035 62/244 |
| 6,123,377 | A | * | 9/2000 | Lecher | ............... | B60H 1/00985 180/315 |
| 7,434,608 | B2 | * | 10/2008 | Shindo | ............... | B60H 1/00207 165/41 |
| 2008/0248736 | A1 | * | 10/2008 | Aoki | ................. | B60H 1/00742 454/75 |
| 2017/0080871 | A1 | | 3/2017 | Mizobata et al. | | |
| 2017/0087958 | A1 | | 3/2017 | Nishina et al. | | |

(Continued)

FOREIGN PATENT DOCUMENTS

| JP | H07266841 A | 10/1995 |
| JP | H10244825 A | 9/1998 |
| JP | 2007261326 A | 10/2007 |

(Continued)

OTHER PUBLICATIONS

Office Action dated Sep. 7, 2021, issued in corresponding JP Patent Application No. 2018-183248 (and English Machine Translation).

*Primary Examiner* — Avinash A Savani
*Assistant Examiner* — Dana K Tighe
(74) *Attorney, Agent, or Firm* — Posz Law Group, PLC

(57) ABSTRACT

A vehicle air conditioner includes an outlet and an inlet. The outlet is provided on a side surface of a center console that is located, in the vehicle width direction, on the inner side of a seat, in which an occupant of the vehicle is seated. The outlet blows out air toward the occupant. The inlet is provided on a side surface of a door trim, which is located on the outer side of the seat in the vehicle width direction, and draws in air that has been blown out from the outlet.

7 Claims, 1 Drawing Sheet

(56) References Cited

U.S. PATENT DOCUMENTS

2018/0290514 A1   10/2018   Nishina et al.

FOREIGN PATENT DOCUMENTS

| JP | 2014-141131 A | 8/2014 |
| JP | 2017-056917 A | 3/2017 |
| JP | 2017-065465 A | 4/2017 |
| JP | 2017065461 A | 4/2017 |

* cited by examiner

VEHICLE AIR CONDITIONER

BACKGROUND

1. Field

The present disclosure relates to a vehicle air conditioner.

2. Description of Related Art

Japanese Laid-Open Patent Publication No. 2014-141131 discloses a vehicle air conditioner that blows air to an occupant seated in a seat of the passenger compartment of a vehicle. The vehicle air conditioner of the publication includes an armrest provided in at least one of the door trim and the center console, which are arranged on the opposite sides of the seat, a main body supporting the armrest, and an outlet that is located between the armrest and the main body. Air supplied from an air conditioning unit is blown out through the outlet. This air conditioner allows the outlet to be arranged in the vicinity of the occupant. Also, when the occupant put the arm on the armrest, the outlet is not blocked by the arm.

The air conditioner of the publication can cause the following inconveniences. That is, if the door trim and the center console each have an outlet, the flows of air blown out from the outlets join above the lap of the occupant. The joined air flow will be blown onto the occupant's face and the like, which may give the occupant a feeling of discomfort. If either the door trim or the center console has an outlet, the flow of air blown out from the outlet passes above the lap of the occupant and some of the air is blown onto the occupant's face and the like.

SUMMARY

It is an objective of the present disclosure to provide a vehicle air conditioner that improves occupant comfort.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In a general aspect, a vehicle air conditioner that includes an outlet and an inlet is provided. The outlet is provided on a side surface of a center console, which is located, in a vehicle width direction, on an inner side of a seat in which an occupant of the vehicle is seated. The outlet blows out air toward the occupant. The inlet is provided on a side surface of a door trim, which is located, in the vehicle width direction, on an outer side of the seat. The inlet draws in the air blown out from the outlet.

Other features and aspects will be apparent from the following detailed description, the drawings, and the claims.

BRIEF DESCRIPTION OF THE DRAWINGS

Throughout the drawings and the detailed description, the same reference numerals refer to the same elements. The drawings may not be to scale, and the relative size, proportions, and depiction of elements in the drawings may be exaggerated for clarity, illustration, and convenience.

DETAILED DESCRIPTION

Figure 1:
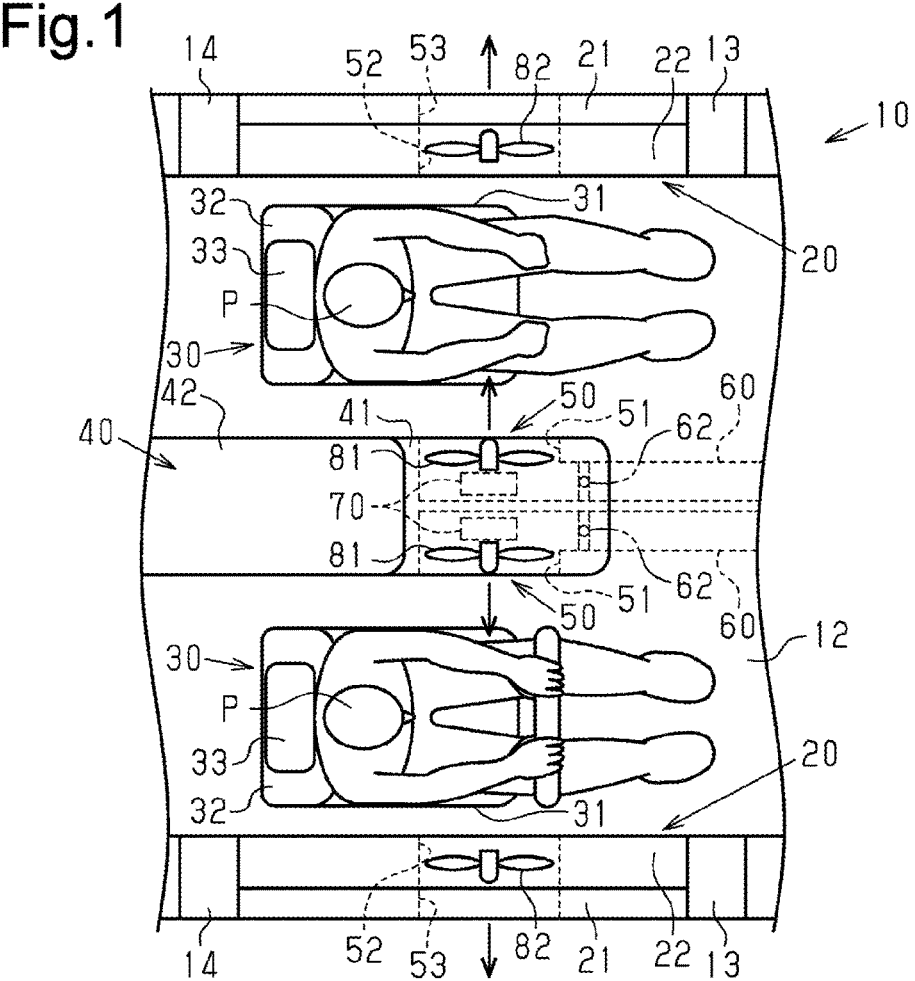
FIG. 1 is a plan view schematically showing a vehicle in which a vehicle air conditioner according to an embodiment is employed.

This description provides a comprehensive understanding of the methods, apparatuses, and/or systems described. Modifications and equivalents of the methods, apparatuses, and/or systems described are apparent to one of ordinary skill in the art. Sequences of operations are exemplary, and may be changed as apparent to one of ordinary skill in the art, with the exception of operations necessarily occurring in a certain order. Descriptions of functions and constructions that are well known to one of ordinary skill in the art may be omitted.

Exemplary embodiments may have different forms, and are not limited to the examples described. However, the examples described are thorough and complete, and convey the full scope of the disclosure to one of ordinary skill in the art.

A vehicle air conditioner 50 (hereinafter, referred to as the air conditioner 50) will now be described with reference to FIGS. 1 and 2.

First, a vehicle 10 in which the air conditioner 50 is employed will be described. The vehicle 10 is an electric vehicle, which travels by driving a motor with electricity of the mounted battery. The vehicle 10 is configured to be bilaterally symmetrical. Accordingly, in some cases, the structure of one of the left side and the right side will be described, and the same reference numerals are given to those components on one side that are the same as the corresponding components on the other side, and redundant explanations are omitted.

As shown in FIG. 1, the vehicle 10 includes a front pillar 13, which extends upward from a floor panel 12, and a center pillar 14, which extends upward from the floor panel 12 and is arranged behind the front pillar 13. The upper end of the front pillar 13 and the upper end of the center pillar 14 are coupled to the roof (not shown) of the vehicle 10. A side door 20 is provided between the front pillar 13 and the center pillar 14. The side door 20 is pivotally coupled to the front pillar 13 via a hinge (not shown).

Figure 2:
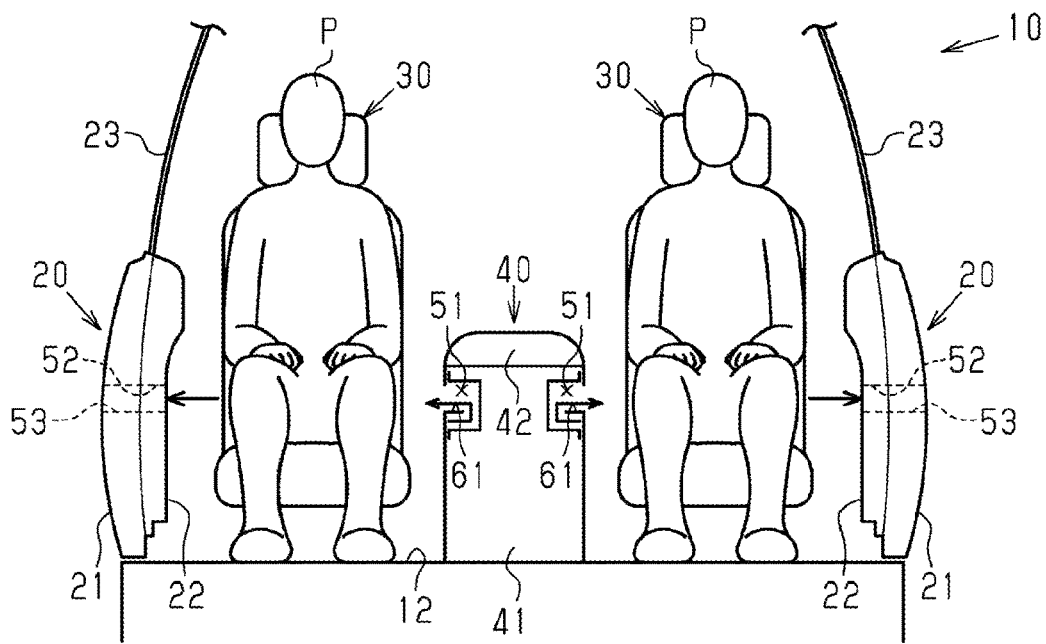
FIG. 2 is a cross-sectional view illustrating the structure of the vehicle air conditioner of the embodiment.

As shown in FIGS. 1 and 2, the side door 20 includes a door main body 21, which forms part of the outer surface of the vehicle 10, and a door trim 22, which is provided on the inner side of the door main body 21. The door main body 21 has a power window 23, which can be lifted and lowered with respect to the door main body 21.

The vehicle 10 includes two seats 30, which are arranged in the vehicle width direction with a space in between. Each seat 30 includes a seat cushion 31, on which an occupant P is seated, a seat back 32, which is coupled to the rear side of the seat cushion 31, and a headrest 33 attached to the top of the seat back 32.

A center console 40 is provided between the seats 30. The center console 40 includes a console main body 41, which extends in the front-rear direction, and a console box 42, which is coupled to the console main body 41.

The vehicle 10 includes the air conditioner 50, which is configured to warm the occupants P seated in the seats 30. The air conditioner 50 includes outlets 51 and inlets 52. The outlets 51 are provided on the opposite side surfaces of the center console 40 in the vehicle width direction and blow air toward the occupants P. The inlets 52 are provided on the side surfaces of the door trims 22 on the opposite sides in the vehicle width direction and draw in air blown out from the outlets 51. The outlets 51 and the inlets 52 are located above the seating faces of the seat cushions 31 of the seats 30. The outlet 51 and the inlet 52 are substantially at the same height from the floor panel 12 and face each other in the vehicle width direction. The outlets 51 and the inlets 52 have rectangular shapes extended in the vehicle front-rear direction.

The outlets 51 are respectively connected connection passages 60, which extend in the vehicle front-rear direction. One end of each connection passage 60 is connected to an air conditioning unit (not shown) provided, for example, in the instrument panel (not shown), and the other end is connected to the outlet 51. The connection passage 60 extends from the air conditioning unit and below the floor panel 12 and is arranged in the center console 40.

As shown in FIG. 2, a flow regulating portion 61 is provided at the lower edge of the opening of each outlet 51. The flow regulating portion 61 extends toward the inner side of the center console 40. The flow regulating portions 61 are provided over the entire length of the outlets 51 in the vehicle front-rear direction. The flow regulating portion 61 causes the air blown out from the outlet 51 to be blown toward the occupant P.

As shown in FIG. 1, a heater 70 that warms air is arranged in a part of the connection passage 60 located inside the center console 40. Also, a first blower 81 for blowing air from the outlet 51 is provided in a section of each connection passage 60 between the heater 70 and the outlet 51.

The door main body 21 of each side door 20 has a discharge port 53, which discharges air that has been drawn into the inlet 52 to the outside of the vehicle 10. A second blower 82 for drawing air into the inlet 52 is provided between the inlet 52 in the door trim 22 and the discharge port 53 of the door main body 21. The discharge port 53 has a valve (not shown), which is opened only when the air conditioner 50 is operating.

The air conditioner 50 of the present embodiment is configured such that the flow rate of the air drawn into the inlets 52 is lower than the flow rate of the air blown out from the outlets 51.

An operation of the present embodiment will now be described.

Air of which the temperature has been regulated by the air conditioning unit flows through the connection passage 60. The first blower 81 is operated so that the air is blown out from the outlet 51 of the center console 40 toward the occupant P. Then, the second blower 82 is operated so that the air blown out from the outlet 51 is drawn into the inlet 52 of the door trim 22. Such a flow of air forms an air curtain from the center console 40 toward the door trim 22.

The present embodiment has the following advantages.

(1) The air conditioner 50 includes the outlet 51 and the inlet 52. The outlet 51 is provided on the side surface of the center console 40, which is located on the inner side of the seat 30 in the vehicle width direction. The occupant P of the vehicle 10 is seated in the seat 30. The outlet 51 blows out air toward the occupant P. The inlet 52 is provided on the side surface of the door trim 22, which is located on the outer side of the seat 30 in the vehicle width direction, and draws in air that has been blown out from the outlet 51.

This configuration operates in the above described manner and is thus capable of properly regulating the body temperature of the occupant P, while preventing air from being blown onto the face of the occupant P using the air curtain. This improves the comfort of the occupant P.

(2) The outlet 51 is configured to blow out air warmed by the heater 70, and the outlet 51 and the inlet 52 are located above the seating face of the seat cushion 31 of the seat 30.

In cold weather, warming the human thighs is effective to promptly regulate the body temperature. With the above-described configuration, the outlet 51 and the inlet 52 are located above the seating face of the seat cushion 31 of the seat 30. Thus, the air curtain from the outlet 51 toward the inlet 52 readily reaches the thighs of the occupant P. Since the air curtain extends from the outlet 51 toward the inlet 52, the air curtain forms a uniform layer of warm air about the thighs of the occupant P. Accordingly, the body temperature of the occupant P is regulated promptly. This further improves the comfort of the occupant P.

The above-described configuration is designed to blow air to the thighs of the occupant P in a concentrated manner and thus reduces the electricity consumption as compared with a configuration that regulates the temperature of the air in the whole interior of the vehicle 10.

(3) The side door 20 of the vehicle 10 includes the door trim 22 and the discharge port 53, which discharges the air that has been drawn into the inlet 52 to the outside of the vehicle 10.

This configuration simplifies the structure of the air conditioner 50 as compared with a case in which the air that has been drawn into the inlet 52 of the door trim 22 is circulated within the vehicle 10.

(4) The center console 40 incorporates a part of the connection passage 60 connected to the outlet 51, and the heater 70 is arranged in the part of the connection passage 60 located inside the center console 40.

This configuration allows the air warmed by the heater 70 to be blown out from the outlet 51, so that the occupant P is warmed promptly in cold weather. This further improves the comfort of the occupant P.

The air that has been warmed by the heater 70 in the center console 40 is blown onto the occupant P through the outlet 51 provided in the center console 40. Thus, the temperature of the air warmed by the heater 70 is unlikely to be lowered before reaching the occupant P. This efficiently warms the occupant P.

(5) The outlets 51 are provided on the opposite sides of the center console 40 in the vehicle width direction, and the inlets 52 are provided on the side surfaces of the door trims 22, which are located on the opposite sides in the vehicle width direction.

This configuration forms an air curtain for each of the two occupants P, who are seated in the two seats 30 arranged on the opposite sides of the center console 40.

(6) The inlet 52 is provided in the door trim 22.

For example, if a duct having an inlet is arranged on the outer side of the seat 30 in the vehicle width direction, the duct may act as an obstacle when the occupant P gets in or out of the vehicle 10.

However, in the above-described configuration, since the inlet 52 is provided in the door trim 22, the occupant P can smoothly get in or out of the vehicle 10.

The above-described embodiment may be modified as follows. The above-described embodiment and the following modifications can be combined as long as the combined modifications remain technically consistent with each other.

As indicated by the long dashed double-short dashed lines in FIG. 1, the air conditioner 50 may include valves 62 that respectively open and close the connection passages 60. This configuration can open the connection passage 60 on the side at which the occupant P is seated, while closing the connection passage 60 on the side at which no occupant is seated. Accordingly, air is blown only onto the occupant P seated in the seat 30. When closing the connection passage 60 with the valve 62, the blower and the heater in that connection passage 60 can be stopped. This favorably reduces the electricity consumption of the air conditioner 50.

The heaters 70 can be omitted. In this case, air that has been warmed by the air conditioning unit may be blown out from the outlet 51. Alternatively, waste heat of the battery of the vehicle 10 may be used to warm the air blown out from the outlet 51.

The vehicle in which the air conditioner 50 is employed is not limited to an electric vehicle. The air conditioner 50 may be employed in a vehicle having an internal combustion engine or a vehicle having a fuel cell.

The air conditioner 50 may be provided only on one side in the width direction of the vehicle 10.

The discharge ports 53 may be omitted. In this case, a connection passage connected to the inlet 52 inside the door trim 22 may be provided, and the air drawn into the inlet 52 may be circulated within the vehicle 10 via the connection passage and blown out from the outlet 51.

The heights of the outlet 51 and the inlet 52 from the floor panel 12 may be different from each other.

The numbers and shapes of the outlet 51 and the inlet 52 may be changed as necessary.

The above-described embodiment illustrates a case in which the occupants P are warmed by the air conditioner 50. However, the air conditioner 50 may be employed to cool the occupants P.

The flow rate of the air blown out from the outlets 51 and the flow rate of the air drawn into the inlets 52 may be adjusted as necessary.

The air conditioner 50 may be used together with a known air conditioner that blows air to the occupants P from the front, seat heaters, and a steering wheel heater.

Various changes in form and details may be made to the examples above without departing from the spirit and scope of the claims and their equivalents. The examples are for the sake of description only, and not for purposes of limitation. Descriptions of features in each example are to be considered as being applicable to similar features or aspects in other examples. Suitable results may be achieved if sequences are performed in a different order, and/or if components in a described system, architecture, device, or circuit are combined differently, and/or replaced or supplemented by other components or their equivalents. The scope of the disclosure is not defined by the detailed description, but by the claims and their equivalents. All variations within the scope of the claims and their equivalents are included in the disclosure.

What is claimed is:

1. A vehicle air conditioner comprising:
    an outlet that is provided on a side surface of a center console, which is located, in a vehicle width direction, on an inner side of a seat in which an occupant of the vehicle is seated, wherein the outlet blows out air toward the occupant;
    an inlet that is provided on a side surface of a door trim, which is located, in the vehicle width direction, on an outer side of the seat, wherein the inlet draws in the air blown out from the outlet;
    a discharge port that is provided in a side door of the vehicle in which the door trim is provided, wherein the discharge port discharges the air that has been drawn into the inlet to an outside of the vehicle; and
    a blower for drawing the air into the inlet, the blower being provided between the inlet and the discharge port.

2. The vehicle air conditioner according to claim 1, wherein
    the outlet is configured to blow out warmed air, and
    the outlet and the inlet are located above a seating face of the seat.

3. The vehicle air conditioner according to claim 1, wherein
    the center console incorporates a part of a connection passage connected to the outlet, and
    a heater that warms air in the connection passage is arranged in the part of the connection passage that is located inside the center console.

4. The vehicle air conditioner according to claim 3, wherein
    the outlet is one of two outlets that are respectively provided on opposite side surfaces of the center console in the vehicle width direction, and
    the inlet is one of two inlets that are respectively provided on side surfaces of door trims on opposite sides in the vehicle width direction.

5. The vehicle air conditioner according to claim 3, wherein a valve is provided in the connection passage to selectively open and close the connection passage.

6. The vehicle air conditioner according to claim 1, wherein
    the outlet is one of two outlets that are respectively provided on opposite side surfaces of the center console in the vehicle width direction, and
    the inlet is one of two inlets that are respectively provided on side surfaces of door trims on opposite sides in the vehicle width direction.

7. The vehicle air conditioner according to claim 6, wherein
    the center console incorporates parts of connection passages respectively connected to the outlets, and
    a valve is provided in each of the connection passages to selectively open and close the respective connection passage.

* * * * *